US007563310B2

(12) United States Patent
Eichert et al.

(10) Patent No.: US 7,563,310 B2
(45) Date of Patent: Jul. 21, 2009

(54) AIR DEHUMIDIFIER FOR OIL-INSULATED TRANSFORMERS, CHOKE COILS AND STEPS SWITCHES

(75) Inventors: Manfred Eichert, Deuerling (DE); Kurt Kugler, Hainsacker (DE); Karsten Viereck, Regenstauf (DE); Rainer Brill, Nidda (DE)

(73) Assignee: Maschinenfabrik Reinhausen GmbH, Regensburg (DE)

( * ) Notice: Subject to any disclaimer, the term of this patent is extended or adjusted under 35 U.S.C. 154(b) by 515 days.

(21) Appl. No.: 10/547,719

(22) PCT Filed: Apr. 1, 2004

(86) PCT No.: PCT/EP2004/003448

§ 371 (c)(1), (2), (4) Date: Aug. 31, 2005

(87) PCT Pub. No.: WO2004/088679

PCT Pub. Date: Oct. 14, 2004

(65) Prior Publication Data

US 2006/0162304 A1 Jul. 27, 2006

(30) Foreign Application Priority Data

Apr. 4, 2003 (DE) ................................ 103 15 719

(51) Int. Cl.
*B01D 53/02* (2006.01)

(52) U.S. Cl. ............................ 96/111; 96/134; 96/135; 95/117; 95/121; 95/126

(58) Field of Classification Search ........................ 53/2; 96/111, 134, 135; 55/434.2; 95/117, 121, 95/126
See application file for complete search history.

(56) References Cited

U.S. PATENT DOCUMENTS

| | | | | |
|---|---|---|---|---|
| 4,942,364 | A * | 7/1990 | Nishijima et al. | 324/696 |
| 5,337,599 | A * | 8/1994 | Hundere et al. | 73/61.62 |
| 5,902,381 | A | 5/1999 | Golner | 96/146 |
| 6,709,496 | B2 | 3/2004 | Viereck | 96/111 |
| 2003/0089238 | A1 * | 5/2003 | Viereck et al. | 96/111 |
| 2007/0199443 | A1 | 8/2007 | Viereck | |

FOREIGN PATENT DOCUMENTS

DE 34 13 071 10/1985

(Continued)

*Primary Examiner*—Duane Smith
*Assistant Examiner*—Karla Hawkins
(74) *Attorney, Agent, or Firm*—Andrew Wilford

(57) ABSTRACT

A dehumidifier for an electrical-equipment air intake has an outer housing wall and a floor of a material with a high specific thermal conductivity downwardly closing the outer housing wall, having a downwardly tapering funnel-shaped inner surface formed with a central downwardly open port, and having a rounded edge where the surface meets the port. An inner air-permeable housing inside the outer housing wall holds a moisture-absorbing mass so that air drawn in through the port can pass through the mass and then into a space between the inner and outer housings. A moisture sensor is provided between the housings and a heater in the mass. A controller connected between the heater and the sensor energizes the heater and cooks moisture out of the mass such that the moisture condenses on the floor and runs over the edge out through the port.

10 Claims, 4 Drawing Sheets

FOREIGN PATENT DOCUMENTS

| | | |
|---|---|---|
| DE | 34 13 888 | 10/1985 |
| EP | 0 481 239 | 4/1992 |
| EP | 1 313 112 | 5/2003 |
| GB | 229 833 | 9/1924 |
| GB | 1 225 673 | 3/1971 |
| JP | 60-198710 | 8/1985 |
| WO | PCT/EP2004/013774 | * 10/2004 |

* cited by examiner

A-A

AIR DEHUMIDIFIER FOR OIL-INSULATED TRANSFORMERS, CHOKE COILS AND STEPS SWITCHES

CROSS REFERENCE TO RELATED APPLICATIONS

This application is the US national phase of PCT application PCT/EP2004/003448, filed 1 Apr. 2004, published 14 Oct. 2004 as WO 2004/088679, and claiming the priority of German patent application 10315719.0 itself filed 4 Apr. 2003, whose entire disclosures are herewith incorporated by reference.

FIELD OF THE INVENTION

The invention relates to a dehumidifier used with an oil-insulated transformer, a choke coil, or a tap changer to dehumidify air drawn into an expansion tank.

BACKGROUND OF THE INVENTION

Such a dehumidifier is already known from JP 60-198710. It has two identically constructed filter chambers that are each filled with a moisture-absorbing material. Air is drawn in from below through a bell arrangement with an oil sump and then passed through at least one of the two filter chambers where it passes through the moisture-absorbing material and is dried to leave the dehumidifier at its top. In addition an electrical heater is provided in each filter chamber. When the moisture-absorbing capacity of the moisture-absorbing material is reached in one of the filter chambers, the respective heater is turned on and the moisture-absorbing material is dried and regenerated. The driven-out moisture is vented from the filter chamber through an outlet.

In European patent application EP 1 313 112 a more developed dehumidifier is proposed. Downstream of a filter filled with moisture-absorbing material a dried-air stream passes over a humidity sensor that operates a heater inside the filter as needed. The humidity sensor determines the humidity of the air passing around it, which air is in theory already dried. When the humidity sensor detects a humidity level in this air stream that exceeds a predetermined limit, this indicates that the moisture-absorbing material is saturated, cannot take on any more water, and must be dried out. Then a switch closes the circuit for a heater, preferably a resistance heater, in the filter. As a result the moisture-absorbing material is heated and dried; the absorbed water drops down and out.

It has been shown that with the known dehumidifiers all of the cooked-out water neither leaves through the outlet above the heater nor at the lower vent. Instead, part of this driven-out water condenses as small droplets on the cylindrical inner wall of the filter chamber or housing of the dehumidifier. These small water droplets, depending on their surface tension, stay there and do not go away. This is undesirable since with time the humidity level at the inner surfaces constantly gets higher. As a result the readings of the described humidity sensor for the humidity of the air surrounding the drying medium does not accurately represent the condition of this medium.

OBJECT OF THE INVENTION

It is an object of the invention to eliminate the described disadvantages of the prior art and to provide a dehumidifier of the described type that has particular means for actuating a heater of moisture-absorbing regenerable filter material and actually driving moisture out of the filter arrangement.

SUMMARY OF THE INVENTION

This object is attained by a dehumidifier having a floor of metal or another material of high specific thermal conductivity and that has a funnel-shaped inner surface that has a rounded lower edge.

The main advantage of the invention is that a specially constructed floor part according to the invention creates a define locally limited dew-point region inside the filter. In this manner there is a localized condensation of the cooked-out water on this floor and the localized condensed water flows off from there.

BRIEF DESCRIPTION OF THE DRAWING

The invention is more closely described in the following with reference to the drawing. Therein.

SPECIFIC DESCRIPTION

Figure 1:
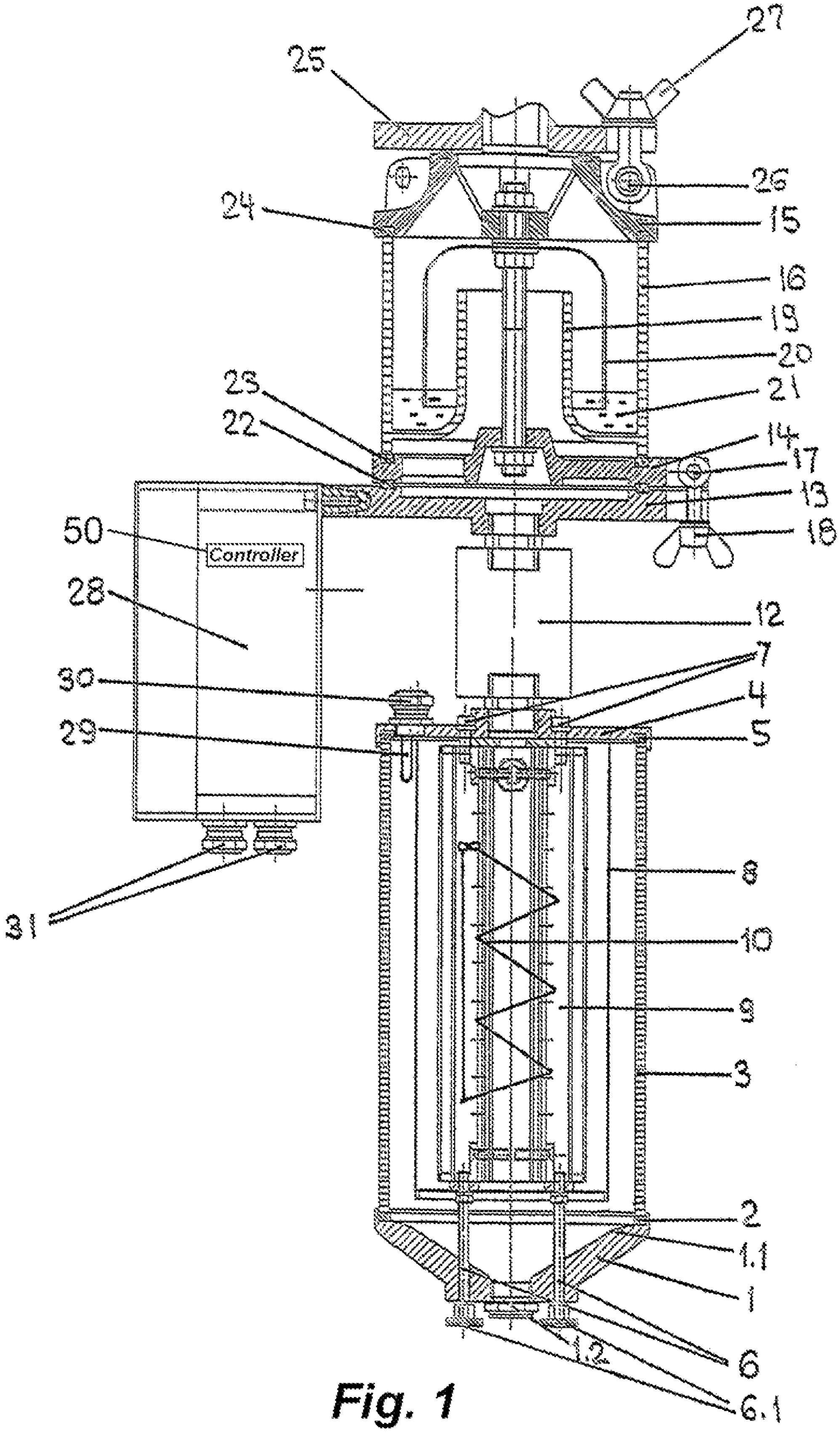
FIG. 1 is a complete dehumidifier according to the invention in a side schematic sectional view.

To start with for better understanding the overall construction of the dehumidifier is more closely described with reference to FIG. 1. The dehumidifier has a floor 1 in which is set a seal ring 2 that bears on a cylindrical side or outer housing wall 3. A cover 4 upwardly closes the side wall 3; here there is another seal ring 5. The assembly is held together by vertical bolts 6 whose lower ends carry knurled nuts 6.1 below the floor 1. At the top there are mounting screws 7. Centrally inside the side wall 3 there is an air-permeable housing 8. This housing 8 holds a mass 9 of regenerable particles of moisture-absorbing material and a heating element imbedded in and surrounded by the mass 9. The mass 9 is only partially shown for clarity of view. Above the cover 4 is a solenoid valve 12 and above the valve 12 there is a lower flange 13 on which is fixed an upper flange 14. Between the upper flange 14 and a cover 15 there is another cylindrical side wall 16. The lower flange 13 and upper flange 14 are connected together by eye screws 17 and butterfly nuts 18. The upper side wall 16 has a bell-shaped inner wall 19 that forms an oil trap 21 with a downwardly open bell 20 fixed inside the wall 16. The volume of the oil trap 21 is limited by the tulip-shaped inner wall 19. Between the lower flange 13 and the upper flange 14 there is another seal ring 22, between the upper flange 14 and the side wall 16 there is seal ring 23, and between the side wall 16 and the cover 15 there is a seal ring 24. Above the cover 15 there is a pipe flange 25 secured in place by eye screws 26 and butterfly nuts 27. Finally there is a control housing 28 that contains the electrical connections and connection wires. Further laterally inside the side wall 3 in the air path there is a humidity sensor 29. This humidity sensor 29 determines as already described above the humidity level of the air passing it. If the sensed humidity level exceeds a predetermined limit, this means that the particle mass 9 is mainly saturated, can take in no more moisture, and must be dried. In this case a controller 50 in the housing 28 closes the electrical circuit for the heater 10. Simultaneously the solenoid valve 12 is closed. The heater 10 then heats up the mass 9 and dries it out. For clarity of view the electrical connections from the heater 10 and from the humidity sensor 29, which run through a screw 30 to the housing 28, are not shown. Finally the controller housing 28 has connectors 31 for unillustrated control and power wires.

Figure 2:
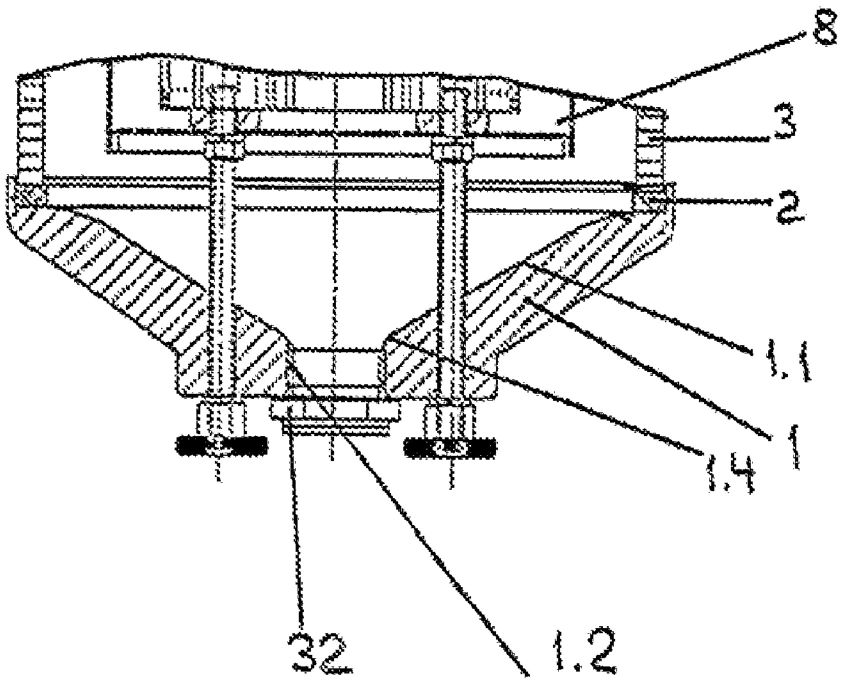
FIG. 2 is a detail of the lower region with a floor part according to the invention.
Figure 3:
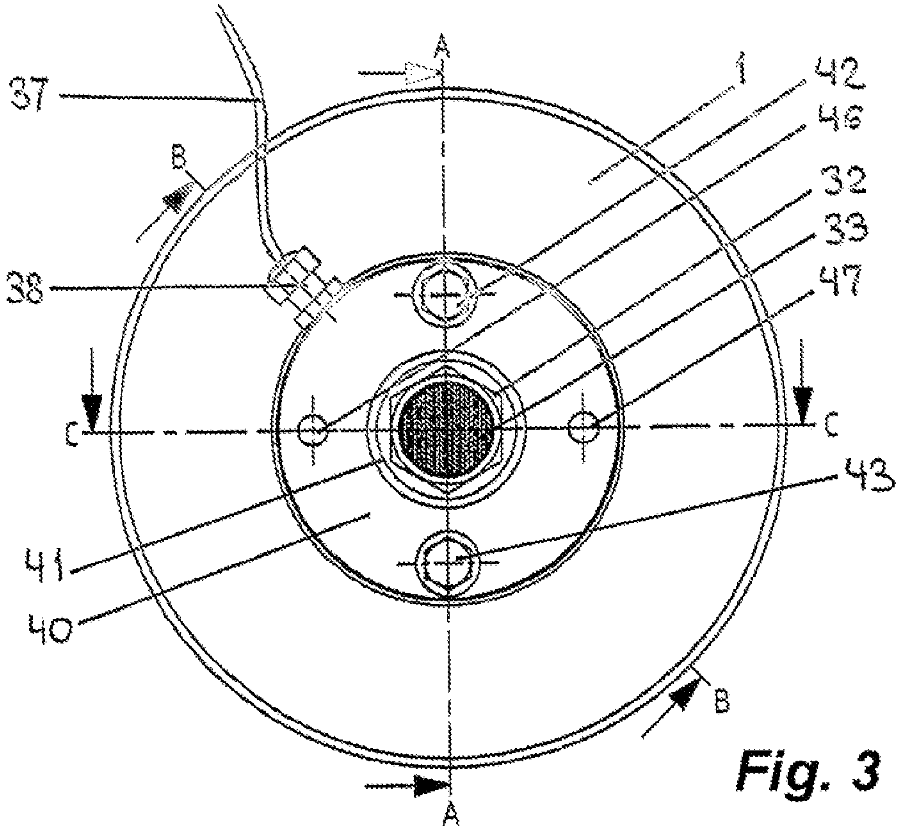
FIG. 3 is a view from below of a floor part alone of another embodiment of the dehumidifier according to the invention.
Figure 4:
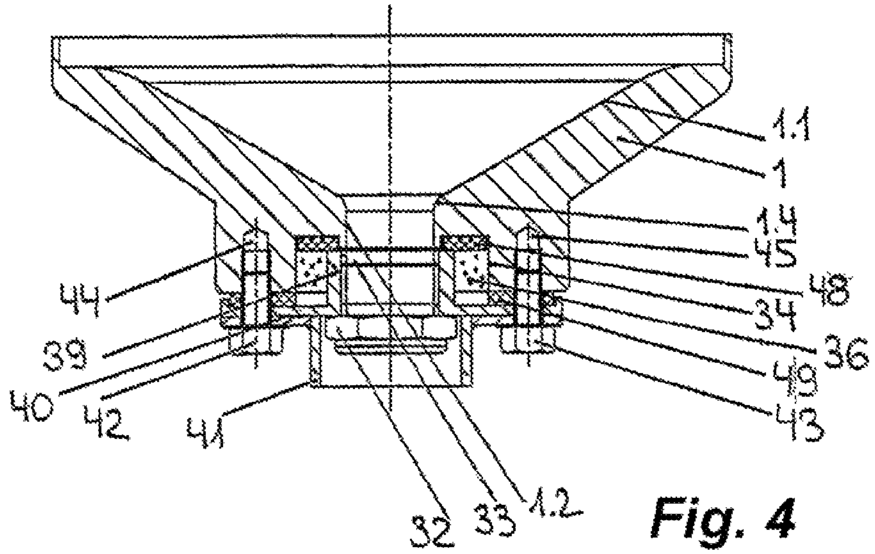
FIGS. 4-6 are further lateral sectional views of the floor part of FIG. 3.
Figure 5:
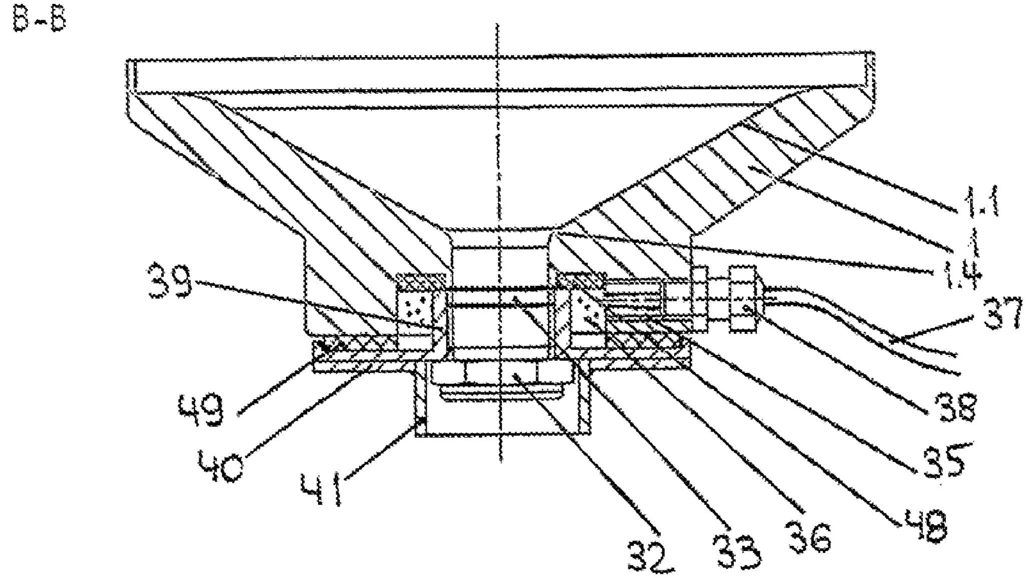
Figure 6:
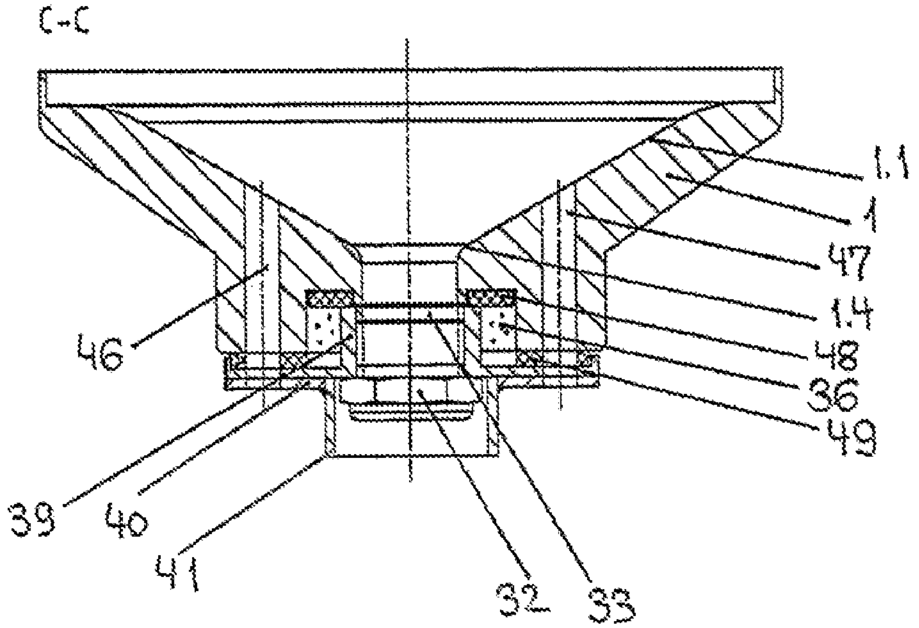

FIG. 2 shows in section the lower part of the dehumidifier in order to better describe the floor 1 according to the invention. The floor 1 is made of metal, is relatively thick, and is highly thermally conductive. It has a frustoconical inner face 1.1 and is centrally formed at its lower point with a port 1.2. The air to be dried is sucked in through this port 1.2 and passed through the air-permeable housing 8 to pass through the particle mass 9 so that it is dried. The same port 1.2 lets the hot liquid that condenses on the inner surface 1.1 run down and out. The use of such a floor 1 that is highly thermally conductive and that has the described funnel-shaped inner surface 1.1 ensures locally limited condensing of the driven-out moisture and thus achieves the object of the invention.

To maximize the described effect it is particularly advantageous to make the side wall 3 of a material that is thermally substantially less conductive.

According to a further feature of the invention the inner surface 1.1 has a rounded lower edge 1.4 so that there are no sharp edges on the entire inner surface 1.1. This ensures the described complete running-off of the liquid condensed there. Finally FIG. 2 shows a threaded fitting 32 that is fitted from below into the port 1.2 and that is not further described here.

FIGS. 3 to 6 show a further floor 1 according to the invention. This floor 1 has other features that are described more closely below.

The screw fitting 32 here has a filter insert 33. Such a filter 33 ensures that no dirt or foreign particles are drawn or otherwise get into the dehumidifier. The filter 33 can for example be made of sintered bronze so that in addition to filtering it also reduces noise.

Normally such a filter insert 33 does not hinder dripping of water down and out. Under certain ambient conditions, particularly at low temperatures, there is the danger of icing at this location. Thus it is necessary in many applications to provide an additional heating of the floor 1 of the dehumidifier according to the invention. To this end the floor 1 is formed with an annular compartment 34 from which an internally threaded bore 35 extends radially outward. The compartment 34 holds an electrical heater 36. An electrical resistance heater is particularly advantageous. Electrical feed wires 37 for the heater 36 extend out through the threaded bore 35 and through a cable fitting 38 screwed into it. The compartment 34 that holds the heater 36, as described, is closed by a floor plate 39. A lower connection is formed by a cover flange 40 that has a central flange-shaped dust shield 41 that surrounds and protects the screw fitting 32. Screws 42 and 43 set in threaded bores 44 and 45 secure the cover flange 40 on the floor 1. In addition the floor 1 has vertically throughgoing holes 46 and 47 through which extend unillustrated tie bolts such as those more closely described with reference to FIG. 1 and shown there at 6.

Finally it is in many cases a good idea to thermally decouple the heating of the floor 1 from the electrical heater 36 so that only the portion immediately surrounding the fitting 32 is heated. In other words the electrical heater 36 is only effective where there is a possibility of icing. Such a thermal dam is constituted by a first insulating washer 48 between the floor 1, the electrical heater 36, and the floor flange 39 and by a second insulating washer 49 between the floor 1 and the flange 39. The insulating washers 48 and 49 are made for example of Teflon and thus prevent warming of the other parts of the dehumidifier according to the invention.

The invention claimed is:

1. A dehumidifier for an electrical-equipment air intake, the dehumidifier comprising:
- an outer housing wall;
- a floor of a material with a high specific thermal conductivity downwardly closing the outer housing wall, having a downwardly tapering funnel-shaped inner surface formed with a central downwardly open port, and having a rounded edge where the surface meets the port;
- an inner air-permeable housing inside the outer housing wall;
- a moisture-absorbing mass in the inner housing, whereby air drawn in through the port can pass through the mass and then into a space between the inner and outer housings;
- a moisture sensor between the housings;
- a first heater in the mass;
- control means connected between the first heater and the sensor for energizing the first heater and cooking moisture out of the mass such that the moisture condenses on the floor and runs over the edge out through the port; and
- a filter insert in the port, whereby incoming air and outgoing moisture must pass through the filter insert; and
- a second heater in the insert and separate from the first heater.

2. The dehumidifier defined in claim 1 wherein the outer housing wall is of a material with a substantially lower specific thermal conductivity than the floor.

3. The dehumidifier defined in claim 2 wherein the floor is of metal.

4. The dehumidifier defined in claim 1 wherein the insert is of sintered bronze.

5. The dehumidifier defined in claim 1 wherein the second heater annularly surrounds the filter insert.

6. The dehumidifier defined in claim 1, further comprising an insulating body between the second heater and the floor.

7. The dehumidifier defined in claim 1 wherein the floor is formed with an annular compartment coaxially surrounding the port and holding the second heater.

8. The dehumidifier defined in claim 1, further comprising a sleeve lining the port and juxtaposed with the second heater.

9. The dehumidifier defined in claim 8 wherein the sleeve is thermally conductive.

10. The dehumidifier defined in claim 1, further comprising
a plate holding the second heater in place on the floor.

* * * * *